(12) United States Patent
Prakash

(10) Patent No.: US 6,985,642 B2
(45) Date of Patent: Jan. 10, 2006

(54) IMAGE SIZE REDUCTION METHOD AND SYSTEM

(75) Inventor: Ravi Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 10/062,066

(22) Filed: Jan. 31, 2002

(65) Prior Publication Data

US 2003/0142885 A1 Jul. 31, 2003

(51) Int. Cl.
*G06K 9/32* (2006.01)
(52) U.S. Cl. ..................................... 382/298; 382/296
(58) Field of Classification Search ................ 382/296, 382/298, 299, 289
See application file for complete search history.

(56) References Cited

U.S. PATENT DOCUMENTS

| | | | |
|---|---|---|---|
| 4,618,991 A * | 10/1986 | Tabata et al. ................ | 382/277 |
| 4,656,664 A | 4/1987 | Anderson et al. | |
| 5,579,418 A * | 11/1996 | Williams et al. ............ | 382/300 |
| 5,850,466 A | 12/1998 | Schott | |
| 5,864,347 A | 1/1999 | Inoue | |
| 5,867,612 A | 2/1999 | Robson | |
| 6,097,855 A * | 8/2000 | Levien ........................ | 382/296 |
| 6,295,385 B1 * | 9/2001 | Takaoka et al. ............ | 382/289 |
| 6,549,683 B1 * | 4/2003 | Bergeron et al. ........... | 382/298 |

OTHER PUBLICATIONS

Andrews, David L., Brown, Randy, Caldwell,Charles, Wheeler,Andrew, "Real Time Character Scaling and Rotation", ACM SIGAPP Applied Computing Review, vol. 3, Issue 1, Summer 1995.*

* cited by examiner

*Primary Examiner*—Bhavesh M. Mehta
*Assistant Examiner*—Sath V. Perungavoor
(74) *Attorney, Agent, or Firm*—Michael F. Hoffman; Hoffman, Warnick & D'Alessandro LLC

(57) ABSTRACT

A system and method for reducing a size of an image. The invention comprises a system for rotating the image in a first direction using a rotation algorithm to generate an intermediate reduced image; a system for rotating the intermediate reduced image in a direction opposite the first direction using the rotation algorithm to generate a final reduced image; and wherein the rotation algorithm uses weighted sums of neighboring pixels in the image prior to rotation to calculate new pixel values. The invention may also comprise an enhancement system for boosting contrast of the final reduced image.

16 Claims, 3 Drawing Sheets

IMAGE SIZE REDUCTION METHOD AND SYSTEM

BACKGROUND OF THE INVENTION

1. Technical Field

The present invention relates generally to imaging systems and more particularly relates to an image reduction system and method that utilizes an image rotation algorithm to achieve a reduced image.

2. Related Art

As devices that utilize digital imaging systems (e.g., scanners, digital cameras, etc.) become more popular, a demand for robust applications that can manipulate digital images has been created. One such application involves image scaling, where for instance, the size of an image is reduced. Available applications range from very simple algorithms that are highly lossy to very complex algorithms that are very sophisticated.

An example of a very sophisticated system may, for example, process a high order surface that is fitted with incoming data, which is then re-sampled. Unfortunately, such sophisticated algorithms become increasingly difficult to implement for small image size reductions, e.g., an image size reduction from 200 pels (picture elements or pixels) to 180 pels. Such systems may therefore be too costly or too slow to implement.

An example of a very simple system may utilize half-scaling, where every other pixel is discarded. When such a system is applied to only slightly reduce an image, e.g., where every tenth pixel has been discarded, unacceptable distortions or artifacts may be introduced into the reduced image.

Accordingly, a need exists for an image reduction system that can efficiently provide small image size reductions without introducing unwanted distortions or computational costs.

SUMMARY OF THE INVENTION

The present invention addresses the above-mentioned issues, as well as others, by providing a system and method for reducing an image. In a first aspect, the invention provides a system for reducing a size of an image, comprising: a system for rotating the image in a first direction using a rotation algorithm to generate an intermediate reduced image; a system for rotating the intermediate reduced image in a direction opposite the first direction using the rotation algorithm to generate a final reduced image; and wherein the rotation algorithm uses weighted sums of neighboring pixels in the image prior to rotation to calculate new pixel values.

In a second aspect, the invention provides a program product stored on a recordable medium for reducing a size of an original image, comprising: means for rotating the original image in a first direction to generate an intermediate reduced image; means for rotating the intermediate reduced image in a direction opposite the first direction to generate a final reduced image; and wherein the means for rotating the original and intermediate reduced image use weighted sums of neighboring pixels in the image prior to rotation to calculate new pixel values.

In a third aspect, the invention provides a method of reducing a size of an image, comprising: providing an original image having W1 pixels in each row; generating an intermediate reduced image having a reduced number of pixels W2 in each row, wherein W2 is less than W1, and wherein for each pixel 1 to W2 in each row, pixel values are calculated based on weighted sums of neighboring pixels in the original image; and generating a further reduced image having W3 pixels in each row, wherein W3 is less than W2, and wherein for each pixel 1 to W3 in each row, pixel values are calculated based on weighted sums of neighboring pixels in the intermediate reduced image.

In a fourth aspect, the invention provides a system for reducing a size of an original image, wherein the original image has a predetermined number of pixels W1 in a row, the system comprising: a system for generating an intermediate reduced image having a reduced number of pixels W2 in the row, wherein W2 is less than W1, and wherein for each pixel 1 to W2 in the row, pixel values are calculated based on weighted sums of neighboring pixels in the original image; and a system for generating a further reduced image having a reduced number of pixels W3 in the row, wherein W3 is less than W2, and wherein for each pixel 1 to W3 in the row, pixel values are calculated based on weighted sums of neighboring pixels in the intermediate reduced image.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
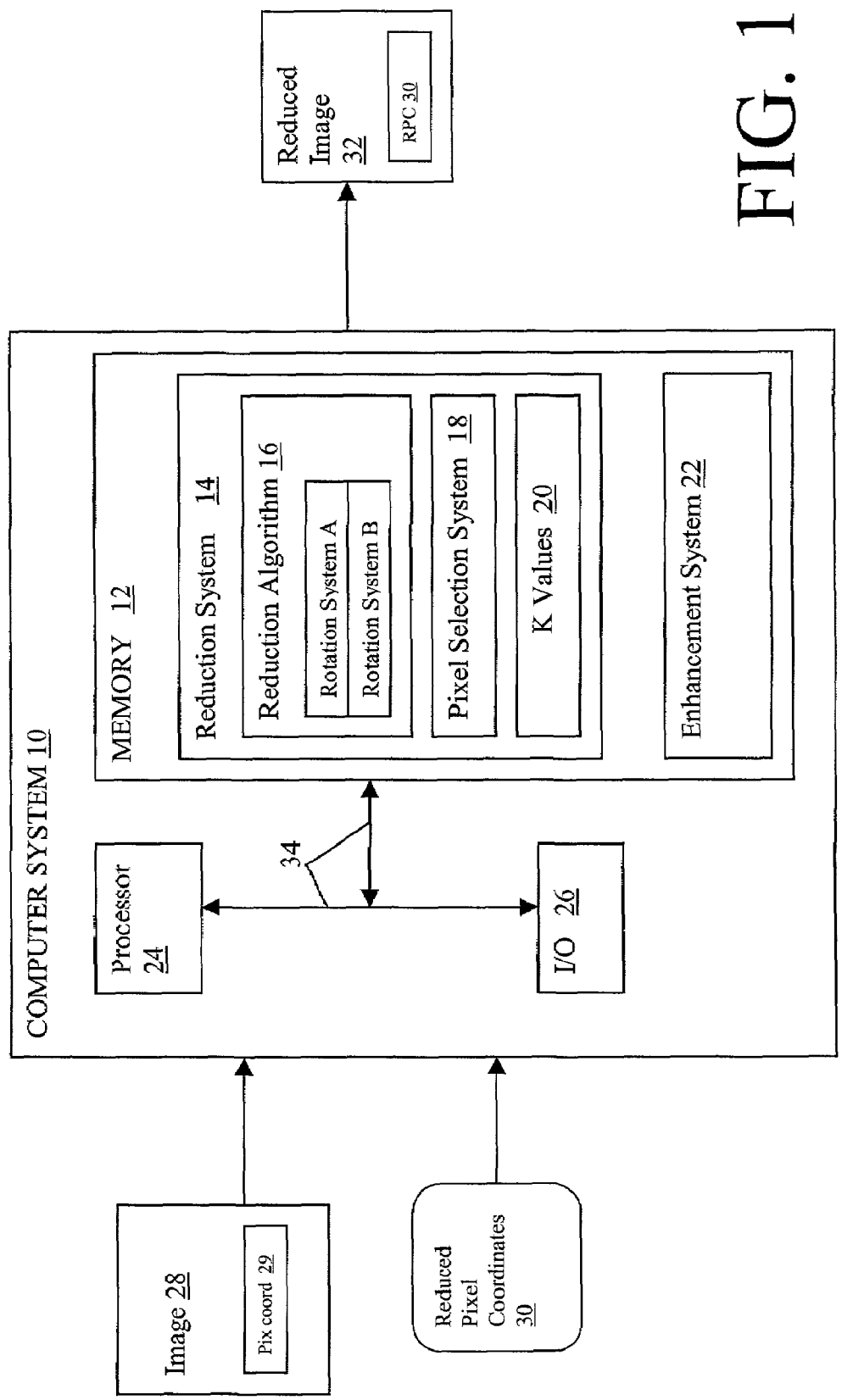
FIG. 1 shows a block diagram of an image reduction system in accordance with the invention.

Referring now to the drawings, FIG. 1 depicts a reduction system 14 embodied in a computer system 10. Computer system 10 receives: (1) an original image 28, having original pixel coordinates 29; and (2) a set of reduced pixel coordinates 30, and outputs a reduced image 32 having the reduced pixel coordinates 30. Thus, for example, the coordinates of the original image 28 may be 201 pixels in width by 231 pixels in height, and the resulting reduced image may be 187 pixels in width by 214 pixels in height. The present invention allows for near continuous image scaling with virtually no loss of information. Thus, for instance, the image size can be reduced so that the resulting image pixel coordinates are multiples of eight, as required for JPEG image compression. It should be appreciated that while in most cases the amount of pixel reduction will be symmetrical with respect to width and height (e.g., 7% in both directions), any reduced pixel coordinates 30 may be inputted, including ones that cause a non-symmetrical result. Thus, the inputted reduced pixel coordinates 30 may be received in any format, e.g., as pixel dimensions such as 187×214, as a reduction percentage such as 10%, etc. It should also be understood that for the purposes of this disclosure, the term "pixel" is synonymous with, and may refer to, any type of picture element, data element, image element, etc.

Computer system 10 generally comprises a processor 24, input/output (I/O) interfaces 26, memory 12, bus 34, and external devices/resources (not shown). Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. Processor 24 may likewise comprise a single processing unit, or be distributed across one or more processing units in one or more locations, e.g., on a client and server.

I/O interfaces 26 may comprise any system for exchanging information from an external source. External devices that can interface with computer system 10 may comprise any known type of external device, including a CRT, LED screen, hand-held device, keyboard, mouse, voice recognition system, speech output system, printer, facsimile, pager, personal digital assistant, cellular phone, web phone, etc. Bus 34 provides a communication link between the components in the computer system 10 and likewise may comprise any known type of transmission link, including electrical, optical, wireless, etc. In addition, although not shown, additional components, such as cache memory, communication systems, system software, etc., may be incorporated into computer system 10.

Communication with computer system 10 may occur in any known fashion, e.g., a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol.

Stored in memory 12 is a reduction system 14 and an enhancement system 22. Although generally shown as software, it should be appreciated that some or all of the functionality of the systems could be implemented with hardware in the form of, e.g., an ASIC (Application Specific Integrated Circuit) device or a FPGA (Field Programmable Gate Array). Reduction system 14 causes the original image 28 to be reduced to a size dictated by the inputted reduced pixel coordinates 30. Enhancement systems 22 enhances any contrast reduction that may have resulted from the size reduction.

Reduction system 14 generally comprises a reduction algorithm 16, a pixel selection system 18, and a system for computing and/or storing constant K values 20. Reduction algorithm 16 reduces the original image by rotating the image in a first direction (Rotation System A), and then rotating the image in a second direction (Rotation System B). According to reduction algorithm 16 detailed below, each rotation causes a size reduction that is proportional to the angle of rotation. Specifically, an image width can be reduced from $W_1$ pixels to $W_2$ pixels by rotating the image to an angle $\alpha$ in accordance with the equation $\cos \alpha = (W_2/W_1)$, or $W_2 = W_1 \cos \alpha$. Similarly, an image height is reduced from $H_1$ pixels to $H_2$ pixels according to the equation $\cos \alpha = (H_2/H_1)$, or $H_2 = H_1 \cos \alpha$. In the present embodiment, the image is rotated twice (e.g., clockwise and then counterclockwise), so that the final reduced image is returned to its original position. Accordingly, the image may be first rotated $\alpha/2$ in a first direction, and then $\alpha/2$ in the opposite direction to achieve the desired reduction. Thus, using the two step process, the image width will be reduced from $W_1$ pixels to $W_2$ pixels to $W_3$ pixels, where $W_1 > W_2 > W_3$, and the image height will be reduced from $H_1$ pixels to $H_2$ pixels to $H_3$ pixels, where $H_1 > H_2 > H_3$.

Where no skewing is desired between the original image 28 and the reduced image 32, $W_2$ and $H_2$ can be readily determined. For instance, for relatively small rotations, the desired reduction can be achieved by selecting $W_2$ and $H_2$ to be approximately a mid-point, e.g., $W_2 \approx \frac{1}{2}(W_1 + W_3)$. As the amount of rotation increases, $W_2$ and $H_2$ will deviate more from the mid-point. In addition, if there is a skewing issue, then $W_2$ can be can be adjusted accordingly, i.e., the amount of rotation in the first and second direction can be made unequal to compensate for the skew. For instance, if the original image having pixel coordinates of $W_1$ and $H_1$ was skewed 3 degrees clockwise, and a 33 degree total rotation was desired to achieve $W_3$ and $H_3$, the first rotation could be 18 degrees counterclockwise, followed by a second clockwise rotation of 15 degrees.

To achieve the desired reduction result, new pixel values are calculated in a two step process. The first calculation reduces the number of pixels $P_1$ in the original image, i.e., $W_1 \times H_1$, to an intermediate reduced image having $P_2$ pixels, i.e., $W_2 \times H_2$, (first rotation). The second calculation reduces the number of pixels in the intermediate reduced image, i.e., $P_2$ pixels, to the final reduced image 32 having $P_3$ pixels, i.e., $W_3 \times H_3$, (second rotation). The reduction/rotation algorithm for both steps calculates each new pixel in a target image using weighted sums of neighboring pixels in the initial image. An exemplary algorithm for reducing an initial image to a target image may be implementing as follows:

$$V_o = K_h * K_v(V_1 + V_4 - V_2 - V_3) + K_h(V_3 - V_4) + K_v(V_2 - V_4) + V_4,$$

where $V_0$ is the new pixel value calculated for each pixel in the target image; $V_1$, $V_2$, $V_3$ and $V_4$ are neighboring pixels of the initial image that incorporate a portion of $V_0$; and $K_h$ and $K_v$ are fractions that are functions of: (1) the number/coordinates of pixels in the target image, and (2) the position of the current pixel $V_0$ in the target image.

Figure 2:
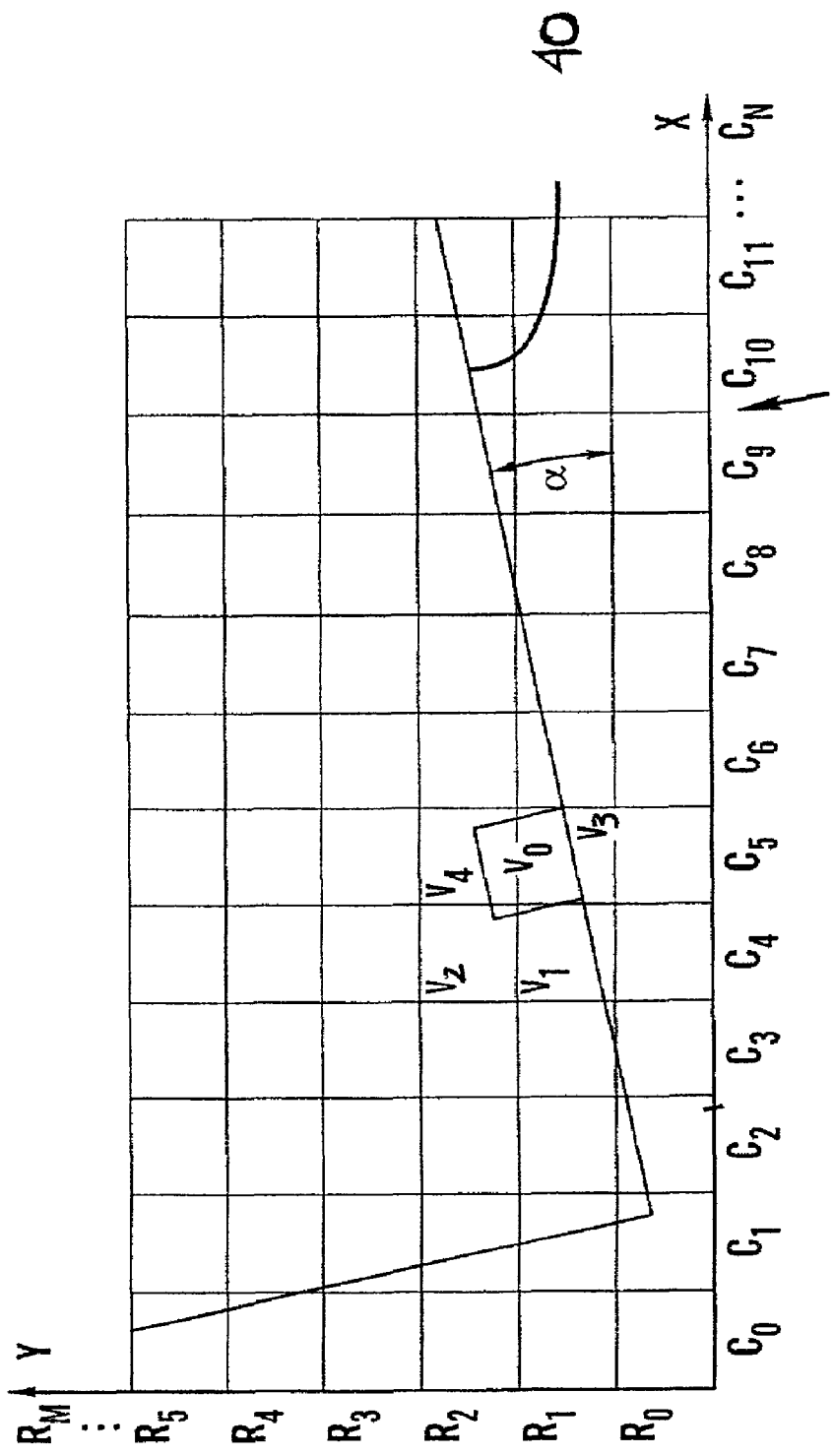
FIG. 2 shows a exemplary initial and target image in accordance with the invention.

FIG. 2 depicts an example of a resulting target image superimposed on an initial image 42. As can be seen, the target image 40 has been rotated by an angle $\alpha$ to effectuate some reduction. In this case it can be seen that a new pixel value $V_0$ (in the target image) is calculated as a function of the neighboring pixels $V_1$, $V_2$, $V_3$ and $V_4$ in the initial image. The process of identifying which neighboring pixels will be used for the calculation of $V_0$ is determined by pixel selection system 18 (FIG. 1). By knowing the angle of rotation $\alpha$, it is a trivial process to identify the position of $V_0$ relative to the pixels of the initial image 42, and therefore identify the neighboring pixels. Pixel selection system 18 can be implemented in any known manner.

Constants $K_h$ and $K_v$ comprise incremental values between 0 and 1, which may be obtained from a table or generated dynamically. In an exemplary embodiment of the invention, $K_h$ and $K_v$ are implemented in ⅛th increments, i.e., ⅛, ¼, ⅜, ½, ⅝, ¾, ⅞ and ⁸⁄₈. $K_h$ values provide horizontal fractions (for each X coordinate in columns $C_0$ to $C_N$, where N is an integer), and $K_v$ values provide vertical fractions (for Y coordinate in rows $R_0$ to $R_M$). Increments of $K_h$ and $K_v$ are assigned to segments of pixels, for example, by dividing the number of pixels in each row or column of the image by eight (8). Thus, for example, a target image having a width of 80 pixels would have 10 pixels in each segment, i.e., 80/8=10. Thus, for pixels 1–10 (i.e., pixels corresponding to columns $C_0$ to $C_9$), $K_h = ⅛$; for pixels 11–20, $K_h = ²⁄₈$; for pixels 21–30, $K_h = ³⁄₈$, and so on. In the case where the target number of pixels is not divisible by eight, the distribution may be made as close as possible to provide even segments.

If the initial image has perpendicular sides, values for $K_v$ may be determined by the same formula as $K_h$. That is, horizontal rows 1–10 (i.e., rows $R_{0-9}$) of pixels, $K_v=\frac{1}{8}$; rows 11–20, $K_v=\frac{1}{4}$; rows 21–30, $K_v=\frac{3}{8}$, and so on. As horizontal rows are extracted the vertical ($R_0$ to $R_M$) coordinate is incremented by one up or down depending on the direction of extraction, which allows for determination of an appropriate $K_v$ fraction.

If the initial image does not have perpendicular sides, increment numbers will vary for $K_h$ and $K_v$ depending on their respective skew angle. That is, values of $K_h$ and $K_v$ will be provided according to the respective skew angle in the respective horizontal and vertical directions.

The appropriate values for $K_h$ and $K_v$ may be stored in at least one lookup table based on the coordinates of the target image and pixel locations. Alternatively, $K_h$ and $K_v$ can be generated dynamically based on the inputted amount of size reduction, e.g., by dividing the vertical and horizontal coordinates of the reduced image by the number of desired segments (e.g., eight), and assigning fractions to each segment. This calculation could be calculated ahead of time when the amount of size reduction is first inputted, stored in a table, and downloaded to the hardware device to improve run-time speeds. As a further alternative, since the reduction can be associated with a skew angle, a lookup table may be based on skew angle. An exemplary $K_h$ lookup table for a target image having 80 pixels in width may take a form as follows:

| SEGMENT: | 1 | 2 | 3 | ... | 8 |
|---|---|---|---|---|---|
| Pixels: | 1–10 | 11–20 | 21–30 | ... | 71–80 |
| $K_h$ value: | 1/8 | 2/8 | 3/8 | ... | 8/8 |

A similar table could be implemented for $K_v$. The rotation system outlined herein is described in further detail in co-pending patent application, U.S. Ser. No. 09/816,318, filed on Mar. 28, 2001, entitled IMAGE ROTATION WITH SUBSTANTIALLY NO ALIASING ERROR, which is hereby incorporated by reference. It should be understood that the use of eight segments is for exemplary purposes only, and other values may be used.

Figure 3:
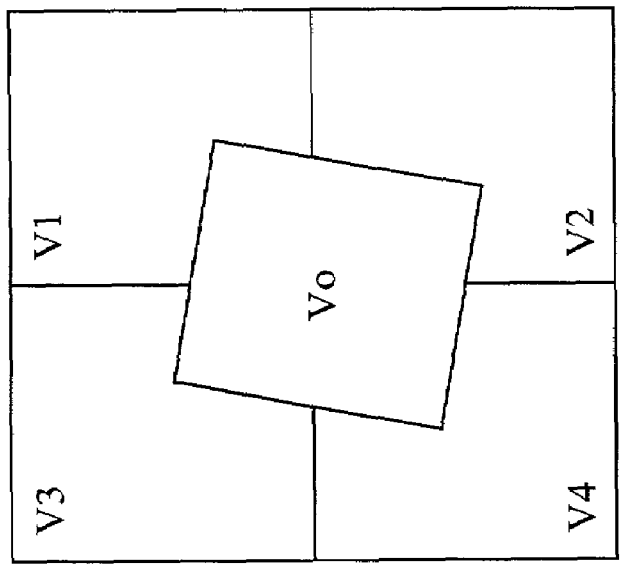
FIG. 3 shows a neighboring pixel configuration in accordance with the invention.
Figure 3:
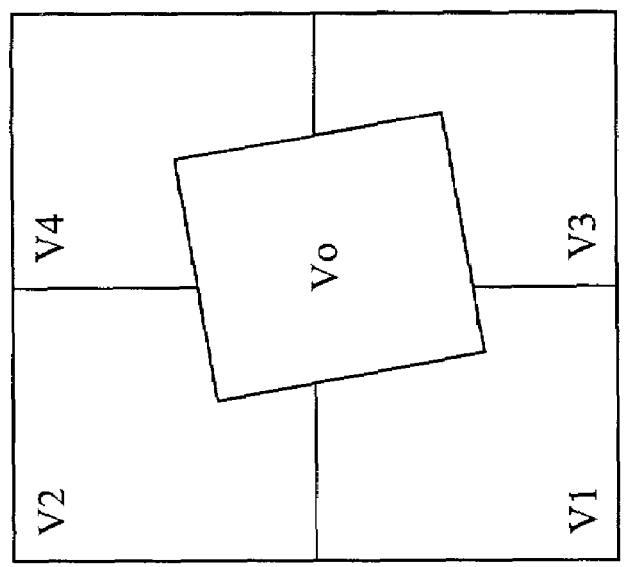

The process of rotating the image in opposite directions can be achieved by altering the location order of the neighboring pixels $V_1$, $V_2$, $V_3$ and $V_4$. Examples of this are shown in FIG. 3. For example, for counter clockwise rotation, the pixels are located as: Quadrant 1: $V_4$, Quadrant 2: $V_2$, Quadrant 3: $V_1$, and Quadrant 4: $V_3$. For clockwise rotation, the pixels are located as: Quadrant 1: $V_1$, Quadrant 2: $V_3$, Quadrant 3: $V_4$, and Quadrant 4: $V_2$.

As noted above, enhancement system 22 is provided to improve contrast lost during the reduction process. Enhancement system 22 may include, for instance, a lookup table having values that will boost the dynamic range of the image. Specifically, the reduction of video gradients can be recovered via well-known image transformation techniques.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A system for reducing a size of an image, comprising:
   a system for rotating the image in a first direction using a rotation algorithm to generate an intermediate reduced image;
   a system for rotating the intermediate reduced image in a direction opposite the first direction using the rotation algorithm to generate a final reduced image; and
   wherein the rotation algorithm uses weighted sums of neighboring pixels in the image prior to rotation to calculate new pixel values, and wherein the rotation algorithm calculates each new pixel value using the formula:

$$V_o = K_h * K_v(V1 + V4 - V2 - V3) + K_h(V3 - V4) + K_v(V2 - V4) + V4,$$

wherein, $V_o$ comprises a rotated data point: V1, V2, V3 and V4 comprise neighboring data points in the image prior to rotation; and $K_h$ and $K_v$ comprise constant values calculated as a function of pixel locations of the rotated image.

2. The system of claim 1, wherein $K_h$ and $K_v$ are stored in a table.

3. The system of claim 1, wherein an amount of size reduction is proportional to an amount of rotation implemented by the rotation algorithm.

4. The system of claim 1, further comprising an enhancement system to boost a dynamic range of the image after the second reduction.

5. The system of claim 1, wherein the final reduced image comprises a total number of pixels that is a multiple of eight.

6. A program product stored on a computer readeable medium for reducing a size of an original image, comprising:
   means for rotating the original image in a first direction to generate an intermediate reduced image;

means for rotating the reduced image in a direction opposite the first direction to generate a final reduced image; and wherein the means for rotating the original and intermediate reduced image use weighted sums of neighboring pixels in the image prior to rotation to calculate new pixel values, and wherein the means for rotating the original and reduced image uses the formula:

$$V_o = K_h * K_v(V1 + V4 - V2 - V3) + K_h(V3 - V4) + K_v(V2 - V4) + V4,$$

wherein $V_0$ comprises a new pixel: V1, V2, V3 end V4 comprise neighboring pixels in the image prior to rotation; and $K_h$ and $K_v$ comprise constant values calculated as a function of a pixel locations of the rotated image.

7. The program product of claim 6, wherein $K_h$ and $K_v$ are stored in a table.

8. The program product of claim 6, wherein an amount of size reduction is proportional to an amount of rotation.

9. The program product of claim 6, further comprising enhancement means to boost a dynamic range of the final reduced image.

10. A method of reducing a size of an image, comprising:

providing an original image having W1 pixels in each row;

generating an intermediate reduced image having W2 pixels in each row, wherein W2 is less than W1, and wherein for each pixel 1 to W2 in each row, pixel values are calculated based on weighted sums of neighboring pixels in the original image;

generating a further reduced image having W3 pixels in each row, wherein W3 is less than W2, and wherein for each pixel 1 to W3 in each row, pixel values are calculated based on weighted sums of neighboring pixels in the intermediate reduced image;

enhancing the further reduced image to boost a dynamic range of the further reduced image; and wherein the step of calculating pixel values based on weighted sums of neighboring pixels in the original image untilizes the formula:

$$W2_o = K_h * K_v(V1 + V4 - V2 - V3) + K_h(V3 - V4) + K_v(V2 - V4) + V4,$$

wherein, $W2_o$ comprises a calculated pixel; V1, V2, V3 and V4 comprise neighboring pixels in the original image; and $K_h$ and $K_v$ comprise constant values calculated as a function of the number of pixels W2.

11. The method of claim 10, wherein the constant values $K_h$ and $K_v$ are further calculated as a function of the location of $W2_o$ in a row of W2 pixels.

12. The method of claim 10, wherein the reduced number of pixels W2 is a multiple of eight.

13. A system for reducing a size of an original image, wherein the original image has a predetermined number of pixels W1 in a row, the system comprising:

a system for generating an intermediate reduced image having a reduced number of pixels W2 in the row, wherein W2 is less than W1, and wherein for each pixel 1 to W2 in the row, pixel values are calculated based on weighted sums of neighboring pixels in the original image; and a system for generating a further reduced image having a reduced number of pixels W3 in the row, wherein W3 is less than W2, and wherein for each pixel 1 to W3 in the row, pixel values are calculated based on weighted sums of neighboring pixels in the intermediate reduced image;

wherein the pixel values are calculated with the formula:

$$W2_o = K_h * K_v(V1 + V4 - V2 - V3) + K_h(V3 - V4) + K_v(V2 - V4) + V4,$$

wherein, $W2_o$ comprises a calculated pixel; V1, V2, V3 and V4 comprise neighboring pixel in the original image; and $K_h$ and $K_v$ comprise constant values calculated as a function of the number of pixels W1.

14. The system of claim 13, further comprising:

an enhancement system to boost a dynamic range of the further reduced image.

15. The system of claim 13, wherein the constant values $K_h$ and $K_v$ are further calculated as a function of the location of $W2_o$ in the row of W2 pixels.

16. The system of claim 13, wherein the reduced number of pixels W3 is a multiple of eight.

* * * * *